R. M. LAFFERTY.

Pumps.

No. 5,440. Reissued June 10, 1873.

ATTEST:
S. Sprague
Chas. E. Hayes

INVENTOR:
Robt. M. Lafferty
By Atty
Wm. S. Sprague

AM. PHOTO-LITHOGRAPHIC CO. N.Y. (OSBORNE'S PROCESS.)

UNITED STATES PATENT OFFICE.

ROBERT M. LAFFERTY, OF TOLEDO, OHIO, ASSIGNOR TO HIMSELF AND E. P. SMITH.

IMPROVEMENT IN PUMPS.

Specification forming part of Letters Patent No. 104,604, dated June 21, 1870; reissue No. 4,678, dated December 19, 1871; reissue No. 5,440, dated June 10, 1873; application filed January 21, 1873.

DIVISION A.

*To all whom it may concern:*

Be it known that I, ROBERT M. LAFFERTY, of Toledo, in the county of Lucas and State of Ohio, formerly of Three Rivers, in the county of St. Joseph and State of Michigan, have invented a new and useful Improvement in Pumps; and I do declare that the following is a true and accurate description thereof, reference being had to the accompanying drawings, and to the letters of reference marked thereon and being a part of this specification, in which—

Figure 1:
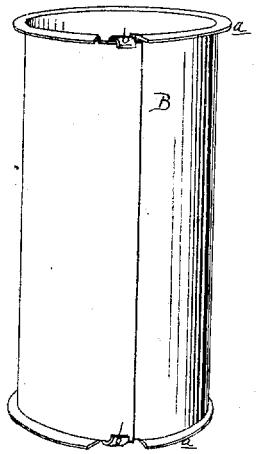
Figure 2:
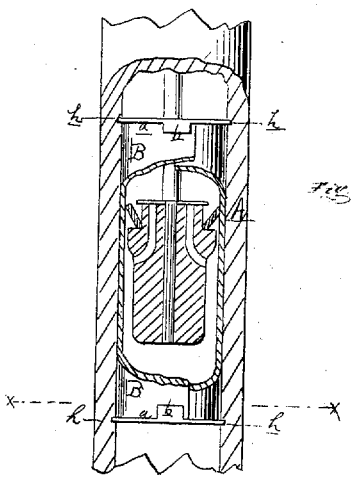
Figure 3:
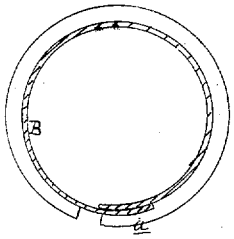

Figure 1 is perspective view of my improved metallic pump-lining. Fig. 2 is a vertical section of the same, inserted in a like section of a pump-stock. Fig. 3 is a cross-section on the line *x x* in Fig. 2.

Like letters indicate like parts in each figure.

The nature of this invention relates to the insertion, within a pump-stock, of a flexible or expansible metallic lining, within which the sucker has its reciprocating motion, for the purpose of preventing wear to the parts. The invention consists in providing pump-stocks with a flexible metallic lining, and in the manner of securing such linings in their proper place within said stocks.

In pumps provided with wooden stocks, the smoothness of the bore is rapidly destroyed by the abrasion of the sucker against said bore, the parts being alternately wet and dry, and by the tendency of the parts to shrink and swell.

In the accompanying drawings, A represents a wooden pump head or stock, which is attached to a pipe or tube terminating in the water, and within which the working parts or sucker of the pump is arranged. B is a sheet-metal lining, made cylindrical in form, and so that the ends of the sheet of which it is made will lap by each other, as shown in Fig. 3. These ends may be secured together, so that the cylinder thus formed may contract or expand in any convenient way; and the following is one of the most simple and effective ways of accomplishing this end: *b* is a lip formed at the commencement of each flange *a*, said lips pointing toward each other. The sheet-metal so arranged is formed into a cylinder by inserting the side, where the flange is cut off, into the lips *b*. Each end of the cylinder formed as above described is provided with an outwardly-projecting flange, *b*. A corresponding groove, *h*, may be cut in the bore of the pump-stock; the lining is then inserted and held in place by the flanges entering said grooves, where they are retained by the natural spring of the lining; crozing or otherwise cutting these grooves may be avoided by forcibly expanding the lining and compelling the flanges to enter the walls of the bore. The outward spring of the metal tends to keep the lining in contact with the walls of the stock, each expanding and contracting with the other, the lips *b* or other equivalent means being employed simply to hold the laps of the ends of the metal together.

What I claim as my invention, and desire to secure by Letters Patent, is—

A flexible or expansible metallic lining, B, in combination with a pump-cylinder, substantially as and for the purpose set forth.

ROBERT M. LAFFERTY.

Witnesses:

THOS. S. SPRAGUE,

H. S. SPRAGUE.